Aug. 29, 1944.  E. W. MILLER  2,356,869
METHOD AND APPARATUS FOR GENERATING GEARS BY PLANETARY MOTION
Filed Feb. 10, 1942  6 Sheets-Sheet 2

Patented Aug. 29, 1944

2,356,869

UNITED STATES PATENT OFFICE 2,356,869

METHOD AND APPARATUS FOR GENERATING GEARS BY PLANETARY MOTION

Edward W. Miller, Springfield, Vt., assignor to The Fellows Gear Shaper Company, Springfield, Vt., a corporation of Vermont Application February 10, 1942, Serial No. 430,220

24 Claims. (Cl. 51—133)

The present invention is concerned with the generation of gear teeth by traverse of the gear to be finished, or a number or series of such gears, in a planetary path, and with a rolling motion across the edge or rim of a cutting tool. Gear finishing with planetary motion in itself is not new, and I have heretofore secured Patent No. 2,038,665 dated April 28, 1936, in which is disclosed a means for traversing a series of gears in a circular orbit, about a fixed axis, while rotating them about their own axes, and causing them to roll successively across the rim of a grinding wheel, the profile of which is formed to the outline of an internal gear tooth conjugate to the tooth forms required to be generated in the revolving gears.

The profiles of such cutting tools, when designed for generating involute gear teeth, and many other tooth curves as well, are curved lines because the internal gear teeth conjugate to the work gears, and to which the tool profiles must conform, have curved faces. In truing or sharpening such tools after wear, exactly the same curvature must be maintained and the trued or sharpened curve must be placed in the same relationship to the orbit of the work piece or pieces as existed prior to sharpening. To do this requires special equipment organized to guide a truing instrument in a particular curved path; and, while it can be done satisfactorily, nevertheless it is much easier to maintain a given profile in tools of this character when the lines of the profile are straight, as in the case of a grinding wheel with conical marginal zones, or one of which the cutting points or edges lie in a plane perpendicular to its axis of rotation.

The main object of this invention is to accomplish the finish-generation of gears with the rapidity characteristic of the planetary action referred to, and to combine with this effect the ability to true or sharpen the cutting tool in straight lines. This object is accomplished by effecting a third relative movement between the work pieces and the cutting tool, such third movement consisting in a relative displacement between the center of orbital revolution and the tool laterally or, in other words, in a direction transverse to the plane in which the tool has its cutting movement. Assuming the cutting tool to remain continuously in one location, the three movements imparted to the work piece are, rotation about its own axis, revolution in an orbit surrounding an axis eccentric to its own axis, and a displacement like that of rolling along a rack having a tooth, or teeth, coinciding with the rim of the tool or faces of two tools.

Another object is to combine with the foregoing the capacity and means for varying the curvature of the generated tooth faces; so as, for example, to generate involutes of different base circles in gears otherwise alike.

A further object is to correlate the rotation of the work piece about its own axis with its orbital travel in a manner such as to cause a different tooth to come into engagement with the cutting tool at each revolution, without indexing the work piece.

In the present specification and drawings I have described and shown embodiments of the invention in grinding machines having two grinding wheels with plane active faces. For this reason the machines will generally be referred to as grinding machines and the tools as grinding wheels. But this is not to be taken as a limitation of the invention to the type of cutting known as grinding, for the same principles may be applied equally well to machines wherein the tools or tool are of metal and have distinct cutting edges.

The invention comprises both a method of operation according to which the teeth of a work gear, or of a plurality of work gears, are successively brought into cutting relation with tools of which the profiles are straight lines, by a combination of orbital and lateral rolling movements; and a machine having cooperative means operable to impart such movements to the work pieces relatively to cutting tools of the character referred to.

In the drawings herewith—

Like reference characters designate the same parts wherever they occur in all the figures.

Figures 5, 5A:
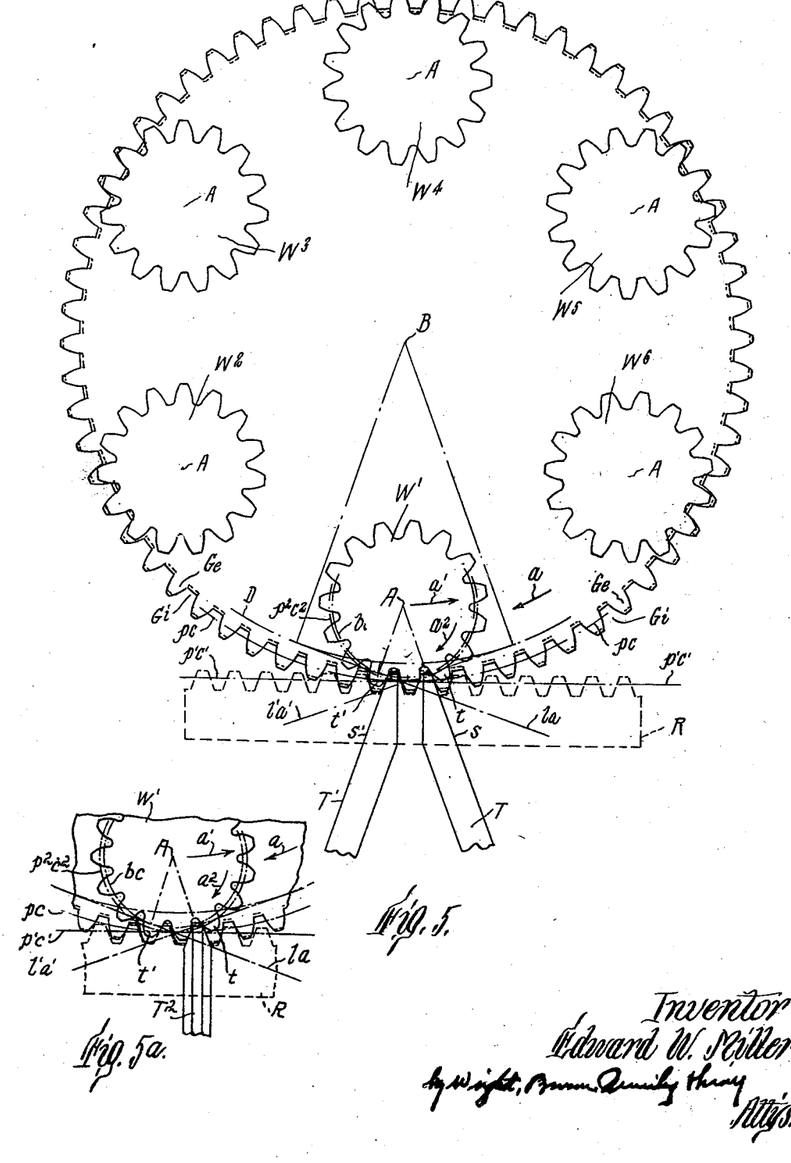
Fig. 5 is a diagram illustrating the principles of the invention.
Fig. 5a is a fragmentary diagram containing the bottom part of that shown in Fig. 5 with the substitution of a double conical grinding wheel for the two plane faced wheels of Fig. 5.

Fig. 5 is referred to first for explanation of the general principles. In this diagram a series or plurality of gears to be finished in a single continuous operation are shown, and are designated as $W^1$, $W^2$, $W^3$, $W^4$, $W^5$ and $W^6$. They are supported with their axes A spaced around a central axis B about which they are caused to revolve. Each work gear is associated in coaxial, and invariable angular, relationship with a master gear which meshes with a conjugate master internal gear $Gi$ of which the axis coincides with the axis of revolution B.

For simplicity of diagrammatic illustration, the work gears are shown in finished condition, and it is assumed that the master gears have the same number of teeth, with the same pitch spacing and pressure angle, as the work gears and that the corresponding teeth of both coaxial gears make the same angles with a given axial plane. Hence the master gears are hidden and the work gears appear to mesh with the internal gear. Actually, however, the work gears and internal gear are in different planes.

The finishing tools T and $T^1$ are here represented as grinding wheels each having a plane active surface perpendicular to its axis, such active surfaces being designated $s$ and $s'$, respectively, and being located suitably to be engaged by one face each of two work gear teeth. If an unchanged relationship were maintained between the grinding wheels and the internal gear $Gi$, the tooth forms generated by the wheel faces $s$ and $s'$ would not be correct for the involute system of gearing. Although the master gears would cause the work gears to roll into and out of engagement with the grinding wheels in correct speed ratio, yet their movement on the curved pitch circle $pc$ would produce in the generated curves errors of inverse character and equal magnitude to the departure of the wheel faces from the curves of the internal gear teeth.

In accordance with this invention a further component of relative movement is effected between the work and tools. This component is the same as would be produced by causing the master internal gear $Gi$ to roll on a pitch circle $pc$, without slip, along a plane surface $p'c'$; and it is effected by providing an external gear $Ge$, or its equivalent, in coaxial rigid connection with the internal master gear $Gi$, and providing a rack R, or the equivalent of a rack, arranged to mesh with gear $Ge$ on the pitch lines $pc$ and $p'c'$. Assuming that the active faces $s$ and $s'$ of the tools are correctly situated with respect to the tooth faces of the rack, then the tools will generate correct involute curves on the work gears by virtue of the compound movement effected by rolling of the external gear on the rack, revolution of the work gears in their orbit, and rotation of the work gears on their own axes. If the pitch diameter of the external gear $Ge$ with respect to the rack is the same as the pitch diameter of the internal gear $Gi$ with respect to the master gears, and the active tool faces are at the same inclinations as the opposite faces of the rack teeth (which is the condition illustrated in the diagram), the generated teeth of the work gears will have the same pressure angle as the teeth of the external gear. Their faces will be involutes of the base circle $bc$, as is made plain by the diagram. $p^2c^2$ is then the pitch circle of the work gear $W^1$ with respect to the rack.

Figure 6:
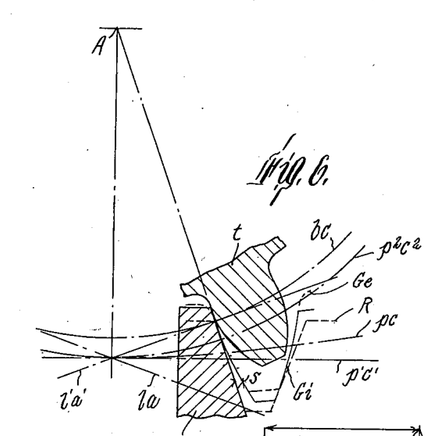
Figs. 6, 7, 8, 9 and 10 are diagrams showing successive steps in the progress of generating a single tooth curve in accordance with the method of this invention.
Figures 7, 8:
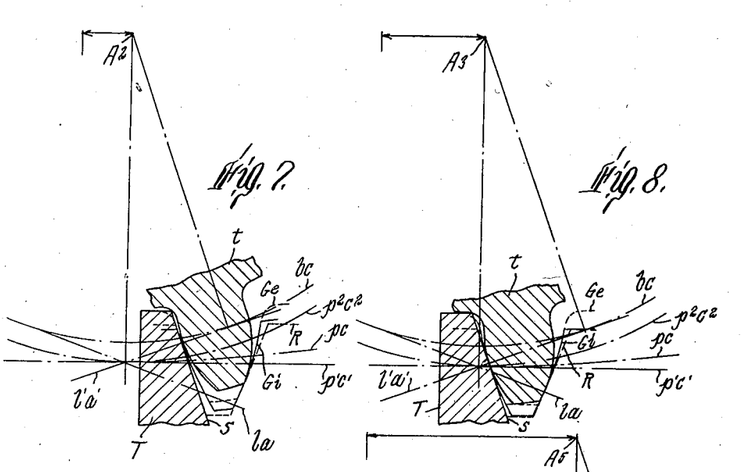
Figure 9:
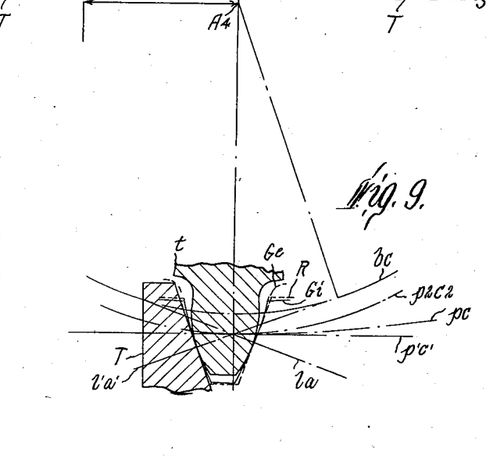
Figure 10:
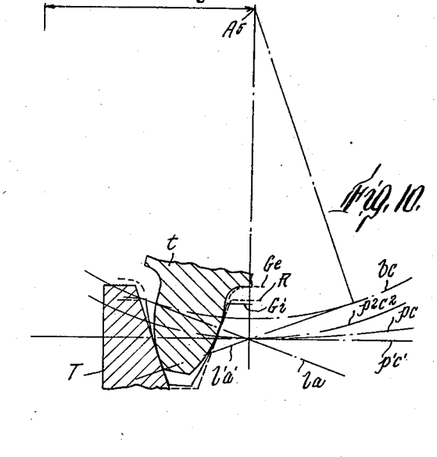

The progress of generating a work gear tooth is further illustrated in Figs. 6–10, inclusive, which are drawn to a larger scale. Here a single tooth, which may be considered as the tooth $t$ of work gear $W^1$, is shown in five positions. That of Fig. 6 is approximately the position of tooth $t$ shown in Fig. 5; that of Fig. 10 is the position at the end of the grinding traverse from root to tip, and the other figures of this group show intermediate positions. The successive positions are based on the assumption that the whole assemblage of gears rolls to the right along the rack R while rotating about the axis B in the direction of the arrow $a$ in Fig. 5; that the work gears revolve counterclockwise about the axis B, as indicated by the arrow $a'$, and rotate clockwise about their own axes, as indicated by the arrow $a^2$, and that the rate of counterclockwise revolution is equal to the rate of clockwise rotation of the assemblage. Thus as the assemblage is displaced laterally with respect to the grinding wheels, to the right from the position shown in Fig. 5, the work gear axis A passes successively to positions $A^2$, $A^3$, $A^4$ and $A^5$, and the axis B is displaced equal distances in the same direction. The corresponding positions of the contiguous teeth of the external and internal gears, and the rack, are designated by the outlines to which the reference characters $Ge$, $Gi$ and R, respectively, are applied, and the pitch and base lines, and lines of action, are designated by the same characters used in Fig. 5. The changing relation of the various tooth outlines as shown in the successive figures demonstrates the ability of the method here described to generate accurate involute teeth. In the performance of the method the gear assemblage is rolled to right and left throughout the range of action of the work gear teeth with the grinding wheels. Substantially one half of its traverse in one direction is shown in Figs. 6–10. In rolling to the left of the position of Fig. 5, other work gear teeth, typified by the tooth $t'$, are rolled over the grinding wheel face $s'$ in a sequence the reverse of that shown in Figs. 6–10.

The assumptions made for the purpose of the foregoing explanation are not limiting factors. Thus the orbital revolution of the work gears need not be at the same rate as the rolling displacement of the assemblage. It may be carried out at any speed and in either direction; and in fact I prefer to revolve the gears rapidly in their orbit while rolling the assemblage at a slow speed. When rolling to the left, the orbital revolution need not be reversed, and ordinarily is not. The several teeth of the work gears then make but brief contact with the grinding wheels in the course of their respective traverses, and none rolls without interruption from the position of Fig. 6 to that of Fig. 10; but eventually all of the teeth occupy each of the five positions here illustrated, and all intermediate positions, and are given smooth and continuous face curvatures of the prescribed character.

The number of teeth of the internal gear is prime to the number of teeth of the work piece gears and their respective master gears. Thus, different teeth of the work gears are brought into engagement with the grinding wheels in each revolution. All the teeth then are ground in a continuous operation, without indexing.

The foregoing method is carried out with the aid of mechanical means and combinations which embody the machine phase of the invention. Machines embodying such phase may have various forms, all of which, however, contain the same principles. The forms here illustrated are hydraulic machines, in which the grinding wheels are rotatably driven, the assemblage of work and master gears is revolved, and that assemblage is rolled back and forth across the rims of the grinding wheels, by hydraulic motors.

Referring now to Figs. 1, 2, 3 and 4, which show a form of the machine designed to operate on a number of gears, 11 represents a stationary machine base having spaced apart uprights 12 and 13 with alined guideways 14, 14 and 15, 15 on their upper ends. A carriage 16 is supported on the uprights 12 and 13 and bridges across the space between them, having ribs 17, 17 and 18, 18 fitted to the respective guideways. The grinding wheels T and T¹ are located in the space beneath the carriage and are secured to spindles which are rotatably mounted in bearings 19 and 20, supported by a stool 21. Hydraulic motors 22 and 23 are coupled to the grinding wheel spindles and impart rotation at suitable grinding speed to the wheels T and T¹.

The grinding wheels are arranged so that their active surfaces s and s' are inclined with respect to the path in which the carriage 16 moves, correspondingly to the inclination of the wheels as shown in Fig. 5 with respect to the rack R. That is, the angles between such faces and path are the complements of the prescribed pressure angles of the work gear teeth, with permissible variations, later described. The further particulars of the grinding wheels and the means for supporting and driving them are not of the essence of the present invention and require no further description here. It is sufficient that grinding wheels, or equivalent cutting tools, are provided in suitable relation to the carriage 16, and the work holding means later described, to perform a cutting operation on the work pieces. It may be remarked, however, that my copending application entitled Automatic gear grinding machine, filed August 29, 1941, Serial No. 408,766, discloses in complete detail means and structures which may be applied to the present machine, not only for supporting and driving the tools, but also for adjusting them to gears of different diameters and pitches, inclining them to finish either spur or helical gears, and truing or sharpening their active faces.

The carriage 16 is provided with bearings 24 and 25 in which is rotatably mounted a massive shaft 26, the axis of which is preferably perpendicular to the directions of carriage movement established by the guides 14 and 15. To afford a sufficiently rigid mounting for the shaft 26, the bearings are held by outboard supports 27 and 28 suspended from massive bars 29 and 30, secured transversely in the upper central part of the carriage.

A head stock carrier 31 and tail stock carrier 32 surround the shaft 26 and are keyed thereto. Head stocks including work spindles 33 are mounted in the carrier 31, spaced from and around the shaft 26 in an arrangement corresponding to that of the work gears with respect to the axis B, shown in Fig. 5. Tail stocks 34 are mounted in the carrier 32 in axial alinement each with one of the spindles 33. The spindles are provided with centers 35 and the tail stocks with centers 36 adapted to support arbors 37, or other shafts, carrying the work gears. Means of any suitable character, such as a key 38, are provided for transmitting rotation from the spindle to the arbor. The tail stocks may have a conventional or other suitable design. In those here illustrated, the center 36 is carried by a sleeve 39 splined to the housing of the tail stock, which is movable back and forth by a screw 40 to which a hand wheel 41 is connected. The shaft 26, carriers 31 and 32, and the head stocks and tail stocks constitute collectively the rotating work holder by which the work pieces are held and are revolved in a planetary manner around the axis of the shaft. This holder and the parts thereof are suitably arranged to locate the orbit of the work pieces in intersecting relation, at its lower side, with the nearer edges of the grinding wheels. In the arrangement here shown, such orbit lies in a vertical plane above the grinding wheels at all points except in that part which thus intersects the grinding wheel rims. It hardly needs saying that the depth of intersection is made such that the work gear teeth will be finished throughout so much of their depth from tip to root as needs to be finished.

Rotation is imparted to the shaft 26 by a hydraulic motor having a casing or housing 42 and a rotor 43. The particular motor here used is of well known character, not original with me, and needs no further description here. Its casing is coupled by means of a vibration-absorbing or damping sleeve 44 with a support 45, which is secured in turn to the shaft bearing support 27; and the rotor is connected to the shaft by a resilient yieldable coupling 46. The sleeve 44 and coupling 46 may be made of rubber composition or any other material sufficiently yielding, and at the same time resilient and strong, both to absorb vibrations and to transmit the torque of the motor to the shaft.

The work spindles 33 all carry master gears 47, which are rigidly clamped and keyed to the spindles. They mesh with an internal gear 48 which corresponds with the internal gear $Gi$ of the preceding description of the method. The internal gear is coaxial with the shaft 26 and is fitted rotatably in a bearing recess 49 in the carriage 16, in which it is confined by an annular retainer plate 50 detachably secured to the adjacent side of the carriage. The pitch diameter of the master gears 47 with respect to the internal gear 48 may be equal to the pitch diameter of the work gears with respect to the grinding wheels, although, as later appears, this is not an essential condition. Preferably the number of teeth of any master gear is the same as the number of teeth of the work gear which is associated with it; but may be an integral multiple or factor of the number of the work gear teeth. The number of teeth of the internal gear is prime to the number of master gear teeth. Consequently the work gear teeth pass the grinding wheels with a rolling motion as with the teeth of a rack, and are relatively advanced (or retarded), so that a different tooth comes into grinding position on each revolution.

The equivalent of the external gear $Ge$ previously described is provided by a cam or former 51 having opposite involute faces 52 and 53, and the equivalent of the rack R is provided by two abutments 54 and 55, which embrace the former and bear on the faces 52 and 53, respectively. It is not essential that the external gear $Ge$ be a complete gear. It may be a segment having any number of teeth, or even a single tooth, or those parts of two teeth which furnish oppositely disposed faces, as here shown; and correspondingly the rack may be reduced to the oppositely disposed face portions of two teeth; provided only that the arcs of the involute tooth (i. e., former) curves contiguous to the abutments are long enough, and suitably located, to maintain mesh with the abutments throughout the full necessary range of lateral displacement between the work gears and grinding wheels.

Figure 3:
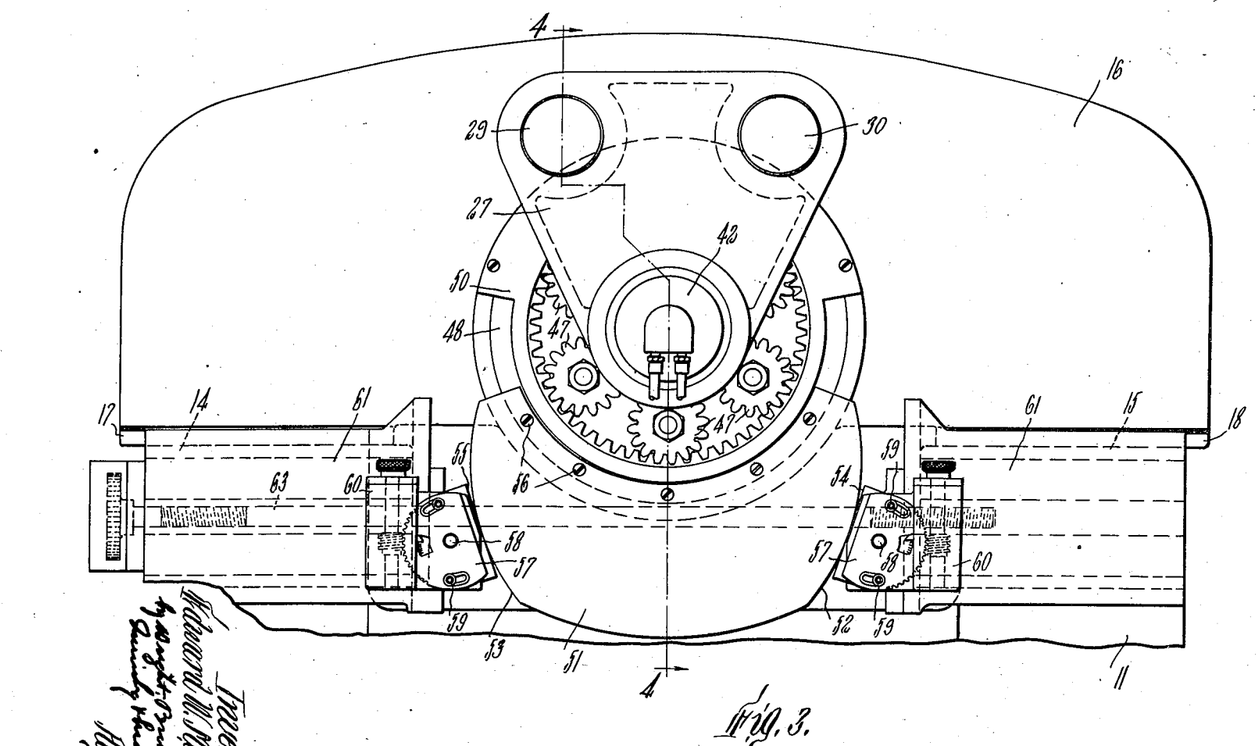
Fig. 3 is a rear elevation of the upper part of the machine drawn on a larger scale than the preceding figures.
Figure 4:
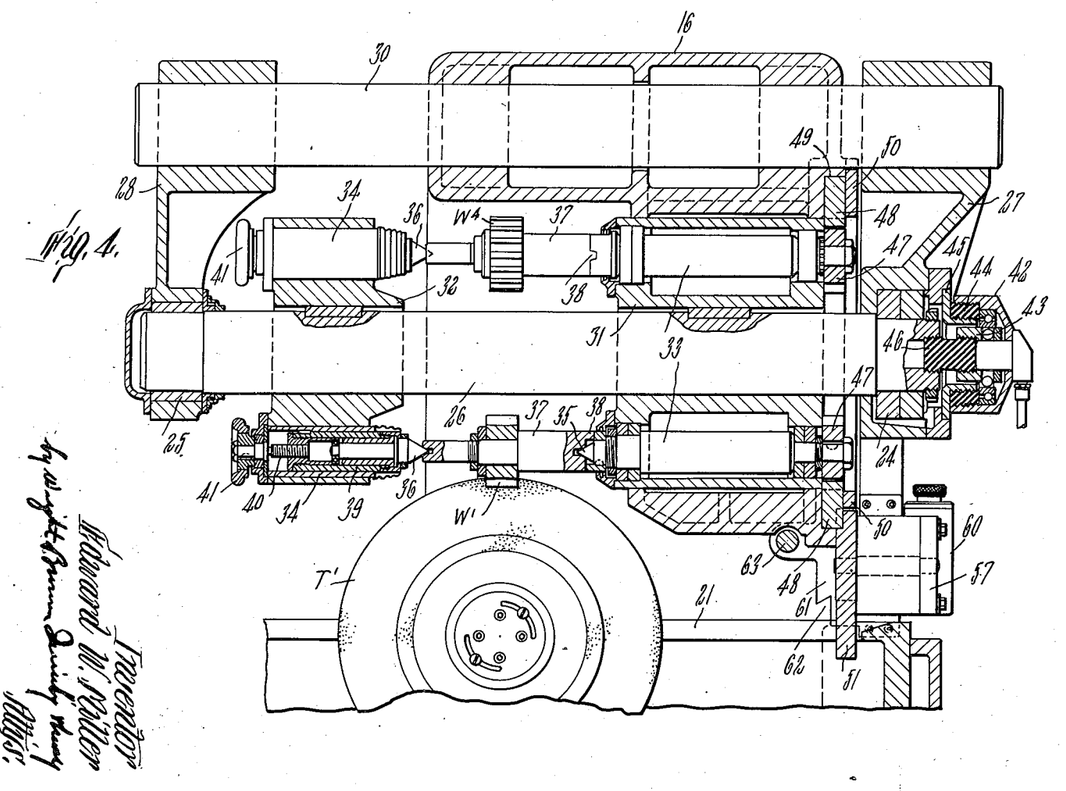
Fig. 4 is a sectional view of the work carriage and work rolling head of the machine taken on line 4—4 of Figs. 1 and 3.

As shown in Fig. 3, the former 51 is secured to the outer side of the internal gear 48 by screws 56 beneath the axis of shaft 26, and is symmetrically located with respect to a vertical plane through said axis when the carriage is in mid stroke. The abutments 54 and 55 have plane faces and are adjustable to set such faces at the same angles to the carriage path as those made by the grinding wheel faces $s$ and $s'$, and also at other inclinations within a limited range in either direction. Preferably the base circle of the faces 52 and 53 is the same as that of the internal gear.

The abutments are secured to angularly adjustable plates 57, which are connected by pivots 58 and clamp screws 59 to holders 60 mounted on slides 61. The latter slides are engaged with guides 62 on the machine base 11, and with right and left threads on an adjusting screw 63; the arrangement of guides 62 and pivots 58 enabling the abutments to be moved together and apart, and also tilted angularly, in the same plane with the former.

The carriage 16 is reciprocated by a hydraulic motor including a cylinder 64 secured to the base upright 13 and a piston in said cylinder coupled by a rod 65 with a bracket 66 secured to the carriage. Said cylinder extends parallel with the guides 14 and 17 and, as fluid is admitted to opposite ends, the piston is caused to propel the carriage alternately in opposite directions. Admission and exhaust of the working fluid to and from opposite ends of the cylinder is controlled by a valve 67 operated by adjustable dogs 68 and 69 on the carriage. The details of the carriage reciprocating means are not important to the present disclosure, and it is sufficient to state that suitable means are provided for moving the carriage back and forth through distances which may be varied to suit work pieces of different character and sufficient to carry the grinding action from the tips of the work piece teeth to as near the roots thereof as may be needed. My copending application previously mentioned shows means which may be used here for so reciprocating the carriage.

Figure 1:
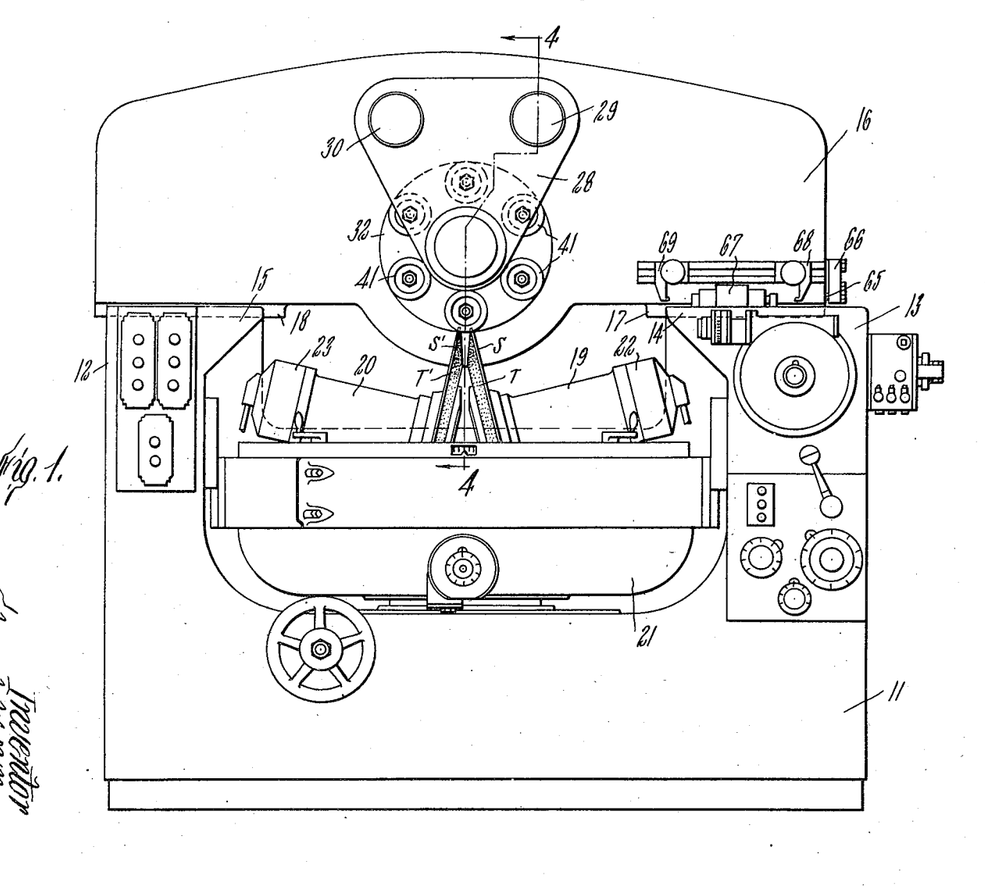
Fig. 1 is a front elevation of a grinding machine, having two plane faced grinding wheels and illustrating one of the combinations of means effective to accomplish the purposes set forth.
Figure 2:
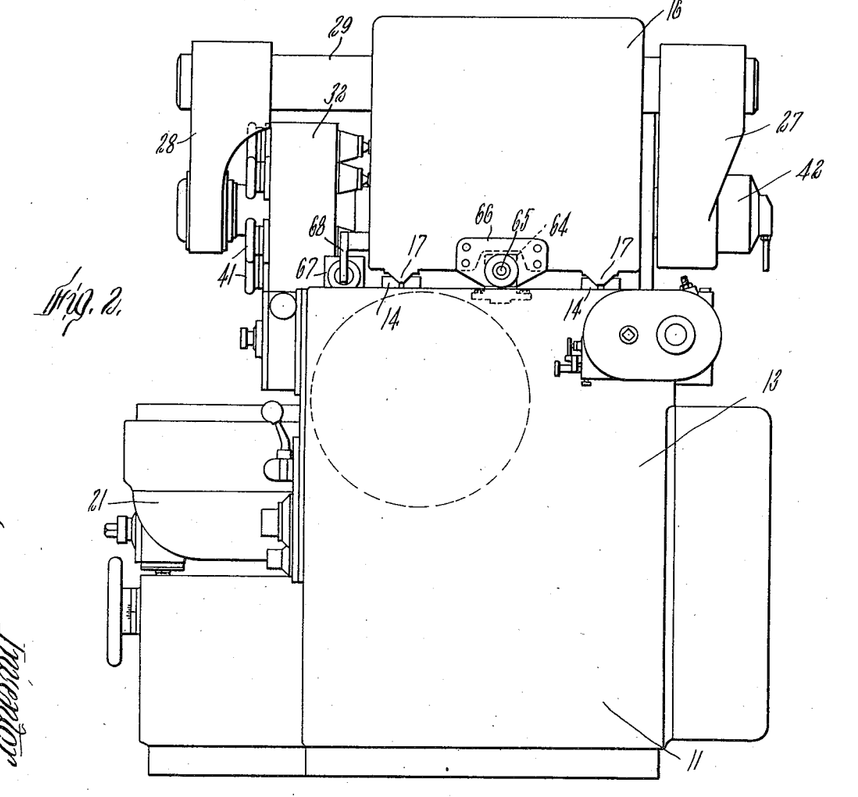
Fig. 2 is an end elevation of that machine as seen from the right of Fig. 1.

As the carriage is thus reciprocated, the former, by reaction against the abutments 55 and 54 in alternation, causes the internal gear 48 to be rolled on the pitch lines $pc$ and $p'c'$ through the positions indicated successively in Figs. 6–10, inclusive, and then in the opposite direction to the central position designated in Figs. 1, 5 and 6, and onward, to the left thereof, through positions corresponding reversely to those of Figs. 6–10. The abutments may be displaced, by rotation of the screw 63, whereby to accomplish a depth feed of the work pieces relatively to the grinding wheels to enable additional amounts of material to be cut from the tooth faces in successive passages. Thus gears with over sized teeth may be cut down to prescribed finished size in a succession of cutting cycles.

Machines containing this invention may be provided with any number of spindles, or equivalent means, for accommodating any number of gears, from one upward, within the limits of practicable dimensions; and, in the case of a machine having a multiple work holder, the devices for supporting the several work gears and corresponding master gears may be located at different distances from the axis B of the orbit, instead of all at the same distance therefrom, as here shown, so that gears of different diameters may be finished in one operation.

It will be evident that variations in the steps of the method and the organization of the mechanical means herein described may be made within the scope of the invention. For example, it is not essential that all the components of relative generating movement between the gears and grinding wheels be imparted to the gears. While it is simpler and more practical to do so, nevertheless one or more of such components may be given to the wheels. Again, it is not essential that there be two grinding wheels, or equivalent tools, provided with cutting points or edges located and rotated in divergent planes. I may employ a single tool having salient conical marginal zones at opposite sides of its mid plane arranged to act on the faces of two work gear teeth bounding a single space, such as the grinding wheels of rack tooth profile heretofore extensively used. Whether conical or plane faced tools are used, however, the elements of the active faces which lie in axial planes are straight lines and may be dressed from time to time, as needed, by dressing tools moving in lines substantially coincident with such elements, or otherwise without deviation from a single path.

What I claim and desire to secure by Letters Patent is:

1. The method of generating tooth curves in work gears, which consists in revolving a work gear in an orbit, simultaneously rotating such gear about its individual axis in the opposite direction to its revolutional movement, operating a cutting tool to produce a cutting movement across a portion of the orbit of the teeth of the work gear farthest distant from the axis of the orbit, and effecting a rolling relative displacement between such orbit and tool substantially in the plane of the orbit.

2. The method of generating gear teeth, which consists in effecting relative movements between a work gear and a cutting tool compounded of rolling such gear across the active portion of such tool on a curved pitch line, without slip, simultaneously displacing the gear with the effect of rolling such pitch line, as a wheel, without slip across the tool, and effecting a relative cutting movement between the tool and the momentarily contiguous work gear teeth.

3. The method of generating gear teeth, which consists in effecting relative movements between a work gear and a cutting tool compounded of rolling such gear across the active portion of such tool without slip on a curved pitch line which intersects said active portion, simultaneously displacing the gear with an effect equivalent to rolling said pitch line without slip on a straight tangent line, and effecting relative cutting movement between the tool and the momentarily contiguous work gear teeth in a direction transverse to said pitch line.

4. The method of generating gear teeth which consists in rotating about its geometrical axis a cutting tool of disk form having a cutting face adjacent to its rim, and effecting relative movements between a gear and said tool compounded of rolling such gear without slip along a curved pitch line which intersects the margin of the tool transversely of the plane of the tool, and simultaneously displacing the gear with an effect equivalent to rolling such pitch line, as a wheel, without slip in opposite directions alternately, in its plane tangent to a straight line.

5. The method of generating gear teeth, which consists in supporting a number of gears in angular distribution around an axis, revolving such gears around such axis and rotating them in the relatively opposite direction about their own axes at a speed such that they roll in non-slip relation with a curved pitch line surrounding the said axis and tangent to the outermost points of the pitch circles of the several gears, effecting a relative cutting traverse between the curved pitch line and a cutting tool having a cutting portion related to said curved pitch line in the manner of the tooth face of a rack in pitch line tangency to the curved pitch line, in a manner to cut the faces of the gear teeth as they roll past the tool, and effecting relative displacement between the cutting tool and the first named axis in directions parallel to the rack pitch line of the tool while the work gears are so revolved and rotated.

6. The method of generating the tooth face curves of gears, which consists in revolving a work gear in an orbit around an axis at one side of the gear axis, rotating the work gear about its own axis in a direction and at a rate such that it rolls in non-slip pitch line relationship with a surrounding circular pitch line concentric with said orbit, said circular line intersecting the marginal portion of a circular cutting tool having a lateral cutting zone contiguous to its circumference, the radial elements of which are related to said circular pitch line like that of the tooth face of a rack having a straight pitch line tangent to the circular line, rotating the cutting tool to perform a cutting effect on the work gear teeth as they roll across the rim of the tool and effecting a rolling displacement between said orbit and the tool at a rate corresponding to non-slip rolling of the before named circular and straight pitch lines with respect to one another.

7. A gear generating machine comprising a rotatable work holder, including means for supporting a work gear to rotate about its own axis eccentric to the rotational axis of the work holder, a master external gear supported by the work holder in coaxial, rotation-controlling relation with the work gear, an internal gear coaxial with the work holder surrounding and meshing with said master gear, a cutting tool mounted mainly outside of, but intersecting at its cutting portion the orbit in which the periphery of the work gear travels when the holder is rotated, in position to perform a cutting action on a work gear supported by the holder, means for effecting relative displacement between the work holder and cutting tool in directions transverse to the axis of the work holder and to the cutting portion of the tool, and means for simultaneously rotating the internal gear around the said axis.

8. A gear tooth generating machne comprising a disk-like cutting tool having a marginal cutting portion of which the intersections with radial planes lie in straight lines, a rotatable work holder having means for supporting a work gear in eccentric relation to the axis of the holder with capability of rotating about its individual axis, the work holder and cutting tool being mounted with the rim intersecting transversely the orbit in which the outer side of the work gear revolves, a master external gear connected with the work gear supporting means, an internal gear coaxial with the work holder and surrounding and meshing with said master gear, means for effecting relative reciprocating movements between the work holder and tool in a direction transverse to the axis of the work holder and to the active face of the tool, and means for simultaneously rotating the internal gear in opposite directions timed with such reciprocating movements.

9. A gear generating machine comprising a grinding wheel having an active face contiguous to its margin, the intersections of which with radial planes are straight lines, means for rotating said wheel about its axis, a work holder rotatable on an axis transverse to the grinding wheel axis, means on said holder for supporting a work gear in planetary arrangement with respect to said axis and in position to cross the rim of the grinding wheel in cutting relation, as to the sides of their teeth, with the active face of the wheel, when the holder is rotated, a master external gear in coaxial, rotation-controlling relation with said work gear, an internal gear coaxial with the work holder surrounding and meshing with said master gear, and means for simultaneously reciprocating the work holder in directions transverse to the axis of the work holder and to the plane of the grinding wheel and rotating the internal gear in opposite directions timed with the reciprocations of the work holder.

10. A gear generating machine comprising a carriage, a rotatable grinding wheel, means for effecting relative reciprocating movements between said carriage and grinding wheel in a path transverse to the plane of the grinding wheel, a work holder mounted on the carriage rotatably with its axis of rotation transverse to the path of said reciprocating movements and to the axis of the grinding wheel, means on said holder for supporting a work gear in planetary relation to said axis and in a position such as to carry its outermost teeth across the rim of the grinding wheel in rolling mesh therewith when the work holder is rotated, a master gear secured to the work supporting means coaxially with the work gear, an internal gear rotatably mounted on the carriage coaxial with the work holder surrounding and meshing with the master gear, an external gear element connected with said internal gear, and rack elements meshing with said external gear element in such relation to the carriage and grinding wheel as to cause rotary movement of the internal gear simultaneously with the movements of relative reciprocation between the carriage and grinding wheel.

11. A generating machine as set forth in claim 8, in which the teeth of the external master gear and the internal gear are prime to one another whereby to cause different teeth of the work gear to come into cooperating relation with the tool during successive revolutions.

12. A generating machine as set forth in claim 10, in which the numbers of teeth of the master gear and internal gear are relatively prime whereby different teeth of the work gear are brought into operative engagement with the grinding wheel with successive revolutions of the work gear.

13. A gear generating machine comprising a supporting base, a carriage mounted for rectilinear reciprocating movement on said base, a work holder mounted on said carriage to rotate about an axis transverse to the reciprocating path of the carriage, having work piece supporting means disposed in eccentric relation to said axis and organized to support and carry a work gear in an orbit surrounding said axis and to rotate said work gear on its own axis, an external master gear connected with said work piece supporting means, an internal gear mounted rotatably on the carriage coaxial with said axis, surrounding and meshing with said master gear, a former secured to said external gear having opposed faces related to one another as the opposite faces of external gear teeth, abutments on the machine base having faces related to the faces of said former as opposite rack tooth faces to the teeth of an external gear, disposed for engagement with the former whereby to effect a prescribed correlation between a rotary movement of the former and internal gear with reciprocating movement of the carriage, and a cutting tool mounted on the machine base to rotate in a plane transverse to the path of the carriage in a location such that its rim intersects the orbit of the outer side of the work gear carried by the work holder, said tool having a cutting portion contiguous to its rim, the profile of which in the plane of the work gear orbit is substantially parallel with one of said abutment faces.

14. A machine as set forth in claim 13, in which the abutments are adjustable along the path of the carriage, whereby to impart an increment of feeding movement to the work gear with respect to the cutting tool.

15. In a gear generating machine of the character described, a base structure, a carriage mounted for reciprocating movement on said structure, means for reciprocating the carriage, a work holder mounted on the carriage to rotate about an axis transverse to the path of the carriage, a motor coupled to said work holder for imparting rotation thereto, master gears supported rotatably by said work holder in planetary arrangement around said axis, means cooperating with said master gears for supporting work gears coaxially with, and transmitting rotation thereto from, the respective master gears, an internal gear supported rotatably by the carriage surrounding and meshing with said master gears, a former secured to the internal gear having oppositely disposed cam faces, and abutments mounted on the supporting structure in position to engage the faces of said former in the manner of stationary rack teeth.

16. In a machine of the character set forth, a supporting structure, a carriage mounted for reciprocating movement thereon, means for reciprocating said carriage in its prescribed path, a shaft supported by said carriage to rotate about an axis transverse to the path of the carriage, motive means coupled to said shaft for rotating it, work spindles supported by said shaft in planetary arrangement around the axis thereof, master external gears secured to said work spindles, an internal gear rotatably supported by the carriage surrounding and meshing with said external gears, a former secured to the internal gear having opposed faces of gear tooth character, and abutments mounted on the supporting structure having faces of rack tooth character disposed for engagement with the faces of the former in the course of reciprocating movement of the carriage so as to cause rotation of the internal gear relatively to the carriage.

17. In a machine of the character set forth, a supporting structure, a carriage mounted for reciprocating movement on said structure, means for reciprocating the carriage, a shaft rotatably supported by the carriage with its axis transverse to the path of reciprocation thereof, a hydraulic motor comprising a casing coupled flexibly with the carriage and a rotor coupled flexibly with said shaft for imparting rotation to the latter, work spindles supported rotatably by said shaft in planetary arrangement around the axis thereof, master external gears secured to the respective spindles, an internal gear rotatably secured by the carriage surrounding and meshing with said master gears, an external gear element secured to said internal gear, and rack elements secured to the supporting structure in rotation transmitting relation to said external gear element.

18. In a machine of the character described, a supporting structure, a carriage reciprocable on said supporting structure, a work holder rotatably mounted on the carriage with its axis of rotation transverse to the path of movement thereof, means for supporting a work gear on said holder with its axis eccentric to the axis of the holder, a master gear secured to the holder coaxially with the prescribed axis of such work gear, an internal gear mounted on the carriage surrounding and meshing with said master gear, means for rotating the work holder and thereby imparting planetary movement to the work gear through coaction of said master gear and internal gear, and means for simultaneously reciprocating the carriage and rotating the internal gear in timed relation such as to superimpose a transverse rolling movement to the work gear in addition to its axial rotation and planetary revolution.

19. In a gear generating machine, the combination with a cutting tool, of a rotatable work holder, means for mounting a work gear on said work holder with its axis parallel and eccentric to the axis of the work holder, a master gear secured to the work holder coaxially with the work gear, an internal gear supported independently of said master gear, surrounding and meshing with the latter in coaxial relation with said work holder, means for rotating said work holder whereby to rotate the work gear and master gear about their own axis and simultaneously revolve them about the axis of the work holder, said cutting tool being located for engagement with a point in the circumference of the work gear during successive revolutions of the latter, means for shifting the work holder and internal gear in a path transverse to their axis and simultaneously rotating the internal gear, and means for producing a relative cutting movement between the tool and work gear.

20. A gear generating machine comprising a rotatably supported spindle, a master gear secured to said spindle with its axis parallel to the axis of the spindle and eccentric thereto, an internal gear surrounding and meshing with said master gear in coaxial relation with the spindle and supported independently of the spindle to compel rotation of the master gear when the spindle is rotated, means for securing a work gear on the spindle in coaxial relation with the master gear, means for rotating the spindle, means for translating the spindle and internal gear in a path transverse to their axis and simultaneously rotating the internal gear, and a cutting tool mounted in position to be engaged by, and perform a cutting action on, teeth of the work gear during successive revolutions thereof.

21. A gear generating machine as set forth in claim 20, in which the numbers of teeth of the master gear and internal gear are relatively prime, whereby to bring different teeth of the work gear into cutting relation with the cutting tool upon successive revolutions of the work gear.

22. A gear generating machine as set forth in claim 20, combined with means for effecting simultaneous displacement of the assemblage of spindle, master gear and internal gear in a direction transverse to the axis of the spindle, and rotation of the internal gear about its axis at a rate correlated with the rate of such displacement to produce a rolling movement of the work gear past the cutting tool in addition to its planetary revolution.

23. A gear generating machine comprising a cutting tool having cutting points arranged to generate prescribed tooth curves in a gear when relative rolling movements are effected between such tool and a work gear, means for effecting a relative movement of revolution between said tool and a work gear, in an orbit so situated that a peripheral portion of the gear is put in cutting relation to the tool in each revolution, means for causing rotation of the work gear about its own axis oppositely to the orbital revolution, and means for simultaneously effecting a rolling displacement between tool and gear additional to the orbital revolution.

24. A machine for generating the tooth face curves of gears comprising a work holder mounted to rotate about an axis and having means for supporting a work gear rotatably with its axis eccentric to the axis of rotation of the work holder, whereby rotation of the holder causes the work gear on said supporting means to revolve in an orbit, means for rotating said holder and means for causing the gear supporting means to rotate simultaneously at a rate and in a direction such that the work gear thereon rolls in non-slip pitch-line relationship with an embracing pitch line curved about the first-named axis, a circular cutting tool having a lateral cutting zone adjacent to its circumference mounted with said zone intersecting said pitch line and the radial elements of the zone related to the pitch line as the tooth face of a rack having a straight pitch line tangent to the curved pitch line, means for rotating said tool to perform a cutting effect on the work gear teeth as the latter roll across the rim of the tool, and means for effecting a rolling displacement between said orbit and the tool at a rate corresponding to non-slip rolling of the before-mentioned curved and straight pitch lines with respect to one another.

EDWARD W. MILLER.